United States Patent
Wynn et al.

(10) Patent No.: US 8,123,943 B2
(45) Date of Patent: Feb. 28, 2012

(54) PERVAPORATION ASSEMBLY

(75) Inventors: Nicholas P Wynn, Redwood City, CA (US); Yu Huang, Palo Alto, CA (US); Tiem Aldajani, San Jose, CA (US); Donald A Fulton, Fairfield, CA (US)

(73) Assignee: Membrane Technology and Research, Inc, Menlo Park, CA (US)

( * ) Notice: Subject to any disclaimer, the term of this patent is extended or adjusted under 35 U.S.C. 154(b) by 84 days.

(21) Appl. No.: 12/794,445

(22) Filed: Jun. 4, 2010

(65) Prior Publication Data

US 2010/0243549 A1    Sep. 30, 2010

Related U.S. Application Data

(62) Division of application No. 11/651,303, filed on Jan. 9, 2007, now Pat. No. 7,758,754.

(51) Int. Cl.
*B01D 15/00*    (2006.01)
*C02F 1/44*    (2006.01)

(52) U.S. Cl. .................. 210/321.6; 210/321.8; 210/175; 210/500.23; 210/641; 95/52

(58) Field of Classification Search .............. 210/640, 210/641, 650, 651, 652, 175, 183, 184, 321.6, 210/321.61, 321.72, 321.78, 321.87, 308, 210/323.2, 323.1, 438, 437, 439, 450, 457, 210/483, 488, 489, 500.23, 321.66, 649; 95/52

See application file for complete search history.

(56) References Cited

U.S. PATENT DOCUMENTS

| | | | |
|---|---|---|---|
| 3,648,754 A | 3/1972 | Sephton | |
| 4,046,685 A | 9/1977 | Bray | |
| 4,293,419 A | 10/1981 | Sekino et al. | |
| 4,352,736 A * | 10/1982 | Ukai et al. | 210/321.88 |
| 4,670,145 A * | 6/1987 | Edwards | 210/321.87 |
| 4,846,973 A | 7/1989 | Barnard | |
| 4,874,405 A | 10/1989 | Minas | |
| 4,900,402 A | 2/1990 | Kaschemekat et al. | |
| 5,137,631 A * | 8/1992 | Eckman et al. | 210/321.8 |
| 5,294,345 A | 3/1994 | Kaschemekat et al. | |
| 5,366,635 A | 11/1994 | Watkins | |
| 5,385,672 A | 1/1995 | Peterson et al. | |
| 5,445,731 A | 8/1995 | Tuohey et al. | |
| 5,494,556 A | 2/1996 | Mita et al. | |
| 5,997,745 A | 12/1999 | Tonelli et al. | |
| 6,273,180 B1 | 8/2001 | Joshi et al. | |
| 6,521,127 B1 | 2/2003 | Chancellor | |
| 6,790,350 B2 | 9/2004 | Pex et al. | |
| 7,510,594 B2 | 3/2009 | Wynn et al. | |
| 2002/0074277 A1 | 6/2002 | Thomassen | |
| 2004/0211726 A1 | 10/2004 | Baig et al. | |
| 2005/0029192 A1* | 2/2005 | Arnold et al. | 210/641 |
| 2006/0174762 A1 | 8/2006 | Kaschemekat | |
| 2007/0039886 A1 | 2/2007 | Bruschke et al. | |
| 2008/0011157 A1 | 1/2008 | Wynn et al. | |

FOREIGN PATENT DOCUMENTS

WO    WO 03/000389    1/2003

\* cited by examiner

*Primary Examiner* — Tony G Soohoo
*Assistant Examiner* — David C Mellon
(74) *Attorney, Agent, or Firm* — K. Bean; J. Farrant

(57) ABSTRACT

The invention is a pervaporation process and pervaporation equipment, using a series of membrane modules, and including inter-module reheating of the feed solution under treatment. The inter-module heating is achieved within the tube or vessel in which the modules are housed, thereby avoiding the need to repeatedly extract the feed solution from the membrane module train.

8 Claims, 13 Drawing Sheets

PERVAPORATION ASSEMBLY

This application is a divisional of U.S. application Ser. No. 11/651,303, which was filed on Jan. 9, 2007 and is now U.S. Pat. No. 7,758,754, the disclosure of which is hereby incorporated by reference in its entirety.

This invention was made in part with Government support under SBIR award number DE-FG02-05ER84244 awarded by the Department of Energy. The Government has certain rights in this invention.

FIELD OF THE INVENTION

The invention relates to pervaporation. In particular, the invention relates to pervaporation processes in which multiple membrane modules are contained in a single housing or vessel.

BACKGROUND OF THE INVENTION

In pervaporation, a multi-component liquid stream is passed across a membrane that preferentially permeates one or more of the components. As the feed liquid flows across the membrane surface, the preferentially permeated components pass through the membrane and are removed as a permeate vapor.

Transport through the membrane is induced by maintaining a vapor pressure on the permeate side of the membrane that is lower than the vapor pressure of the feed liquid. The vapor pressure difference is usually achieved by maintaining the feed liquid at a higher temperature than that of the permeate stream. The latent heat of evaporation of the permeate components must be supplied to the feed liquid for the feed temperature to be maintained and for the pervaporation process to continue.

In a typical separation, such as that of an alcohol from water, the feed cools about 5° C. for every 1% of the feed that permeates the membrane. In industrial pervaporation processes, an average of about 5% of the feed permeates the membrane per module. The corresponding temperature drop is thus about 25° C. Other separations may involve greater or lesser temperature drops.

The temperature drop is reversed by withdrawing the feed solution and running it through individual heaters or heat exchange cycles between each module. This is commonly referred to as inter-stage heating.

To accommodate these requirements for inter-module or inter-stage reheating, pervaporation systems must include numerous pipes, flanges, valves and other fittings to enable the feed solution to pass in and out of the vessel housing the modules. This makes the systems complex to engineer, cumbersome to build, and costly, and limits the industrial utility of pervaporation.

In consequence, although commercial pervaporation systems have been available for more than twenty years, few practical applications for a process that is otherwise attractive have been realized.

Co-owned U.S. Pat. Nos. 7,404,843 and 7,510,594, and co-owned, co-pending U.S. patent application Ser. No. 11/484,547, disclose gas separation equipment in which multiple membrane modules in multiple tubes are contained in a single housing. These three patent applications are incorporated herein by reference in their entireties.

SUMMARY OF THE INVENTION

The invention is a pervaporation process and pervaporation equipment for separating a component from a liquid mixture, the mixture typically containing water and at least one organic component, or being a mixture of at least two organic components.

The separation is carried out by running a feed stream of the liquid mixture across a separation membrane under pervaporation conditions. By pervaporation conditions, we mean that the vapor pressure of the component that it is desired to separate into the permeate stream is maintained at a lower level on the permeate side than on the feed side, and the pressure on the permeate side is such that the permeate is in the gas phase as it emerges from the membrane. The process results, therefore, in a permeate vapor stream enriched in the desired component and a residue liquid stream depleted in that component.

In a first aspect, the process is carried out using multiple membrane modules or elements arranged in series within a single tube, so that the residue stream exiting the first module in the series forms the feed to the second module, and so on, until the final or product residue stream is withdrawn from the last module in the series.

To maintain adequate transmembrane flux, the feed solution under treatment is heated within the tube as it passes from one module to the next. This interstage heating or reheating is achieved by blocking the straight flow path from the residue end of one module to the feed end of the next, and by heating the outside surface of the tube. Instead of passing directly to the inlet of the next module, the feed is directed in a flow path in the annular space between the inside wall or surface of the tube and the outer casing or surface of the membrane module that it has just exited. By forcing the stream to flow at least partially back along the outside of the module, it is brought into heat exchanging contact with the inside surface of the tube.

In a basic embodiment, the pervaporation process of the invention includes the following steps:

(a) passing a feed solution to be treated through a series of multiple membrane modules, each membrane module having an outer longitudinal surface, a feed end and a residue end, the membrane modules being housed in a single tube having an inside and an outside surface, to separate the feed solution under pervaporation conditions into a residue stream and a permeate stream; and (b) achieving an inter-module reheating of the feed solution as it passes along the series by:

(i) flowing the feed solution exiting the residue end of a membrane module in the series at least partially back toward the feed end of that membrane module in a reheating zone defined by the outer longitudinal surface of that membrane module and the inside surface of the tube before the feed solution is permitted to enter the feed end of the next membrane module in the series; and (ii) heating the outside surface of the tube.

The process divides the feed stream into a treated residue stream and a permeate stream, either or both of which may be desired products of the process. For example, if the feed solution is a dilute solution of ethanol in water, the process of the invention may be used to form a more concentrated ethanol product as the permeate stream. Likewise, if the feed solution is ethanol containing just a few percent of water, the process of the invention may be used to dehydrate the ethanol, forming a purified ethanol product as the residue stream.

The membrane modules or elements are housed in a tube. The tube serves to house and support the membrane elements and provide a directed fluid flow. In addition, the tube conducts heat to warm the feed solution as it passes along the train of modules, and may provide a pressure-withstanding function if the pressure conditions under which the separation process is carried out are substantially different from the pressure outside the tube.

The outside of the tube may be heated in any appropriate manner. Preferably, low grade steam is used if available.

The membrane used to perform the separation may be any type of membrane capable of performing an appropriate separation under pervaporation conditions. Suitable membranes include polymeric membranes, inorganic membranes, such as ceramic membranes, and membranes containing inorganic particles embedded in a polymeric matrix. For example, if the feed solution is to be dehydrated, a hydrophilic membrane, such as a polyvinyl alcohol membrane, may be used. If the feed solution is a mixture of olefins and paraffins, a hydrophobic membrane, such as a fluorinated polyimide membrane, may be used.

The membranes and modules may take any convenient cylindrical form, such as flat sheets wound into spiral-wound modules, potted hollow fibers or tubular membranes that will fit into the tube so as to leave an annular space between the outer longitudinal surface of a membrane module and the inside surface of the tube. The configuration of the process and apparatus of the invention is not suitable for plate-and-frame modules, as these are usually assembled in stacks, not housed in tubes or cylindrical pressure vessels.

The series includes at least two modules, and will typically include three, four, five or six modules mounted end to end in the tube. The modules are connected as described above such that a feed stream under treatment may enter the feed end of the first module, flow through the modules in turn and exit as a final residue stream from the residue end of the last module. The modules are also connected by a permeate pipe or pipes, through which the collected permeate stream from the series can flow.

The driving force for transmembrane permeation is the difference between the vapor pressure of the feed liquid and the vapor pressure on the permeate side. This pressure difference is generated at least in part by operating with the feed liquid at above ambient temperature, usually above 30° C., and typically in the range 30-120° C. Optionally, the permeate side may also be maintained under vacuum to increase the driving force.

To heat the feed solution as it passes along the chain of modules, the feed solution is prevented from flowing in a straight line immediately from the residue end of one module to the feed of the next. Instead, the feed solution exiting the residue end of a module is directed at least partially back along the outside of the module it has just exited, into a reheating space or zone between the outer longitudinal surface of that module and the inside surface of the tube. The reheated residue solution is then directed out of the reheating space to the feed inlet end of the next module.

Any flow-blocking and flow-directing means that achieves this flow path can be used within the scope of the invention.

A preferred means is an adapted end cap. The caps are mounted on the residue ends of the modules and engage in fluid-sealing manner against the inside surface of the tube. Liquid leaving the module is directed by suitably configured channels within the end cap, so that it exits into the reheating space associated with that module, and must flow through or across that space before passing through another channel in the end cap that leads toward the feed end of the next module. To improve flow distribution within the reheating zone, straight or curved baffles, fins or ribs may extend along the reheating zone.

Another example of a suitable flow-blocking and flow-directing means is a specially adapted flow-directing plate positioned between one module and the next in the series.

The process of the invention provides an improved technique for carrying out any pervaporation operation that requires the use of multiple modules in series. The new process avoids the need to extract the solution under treatment from the membrane module train to run it repeatedly through external heaters or heat exchangers. Not only does this provide better heat integration, but the large numbers of pipes, valves, flanges and fittings associated with repeated removal and reintroduction are eliminated. As a commercial pervaporation train may contain as many as ten pervaporation-reheating steps, the savings in engineering complexity and cost is substantial.

In a second aspect, the invention provides for separation of a liquid mixture according to the principles described above, but in this case there are multiple series of modules, mounted in multiple tubes, and the tubes themselves are contained within a single outer housing, assembly or vessel. In this case, the savings in complexity and cost are even more marked.

In this aspect, the process of the invention includes the following steps:

(a) providing a vessel in which multiple tubes are mounted in parallel, each tube having an inside and an outside surface and containing a series of multiple membrane modules, each membrane module having an outer longitudinal surface, a feed end and a residue end;

(b) passing a feed solution to be treated through the membrane modules to separate the feed solution under pervaporation conditions into a residue stream and a permeate stream;

(c) achieving an inter-module reheating of the feed solution as it passes along the series of modules by:

(i) flowing the feed solution exiting the residue end of a membrane module in the series at least partially back toward the feed end of that membrane module in a reheating zone defined by the outer longitudinal surface of that membrane module and the inside surface of the tube before the feed solution is permitted to enter the feed end of the next membrane module in the series; and (ii) heating the outside surfaces of the tubes by flowing a heating fluid through the vessel.

In this case, the preferences for the layout within each tube of membrane modules and flow-blocking and flow-directing elements are similar to those for the single-tube process.

In a third aspect, the invention is the pervaporation equipment, system or apparatus adapted to carry out the pervaporation separation process. In this aspect, the invention includes the following elements:

(a) a series of multiple membrane modules, each membrane module having an outer longitudinal surface, a feed end and a residue end, and including a permeate pipe protruding from the membrane module, the membrane modules having their permeate pipes connected in an end-to-end manner;

(b) a tube containing the membrane modules, the tube comprising at least one removable head and a shell having an inside surface and an outside surface, the tube being provided with a feed inlet port and a residue outlet port and adapted so that a permeate stream flowing through the permeate pipes may be withdrawn from the tube;

(c) an annular seal for each membrane module, positioned so as to provide a fluid-tight seal between the outer longitudinal surface of the module and the inside surface of the tube;

(d) flow-blocking and flow-directing means positioned in the tube so as to block immediate flow of a fluid from the residue end of a membrane module to the feed end of the next membrane module in the series;

(e) an annular reheating zone between the outer longitudinal surface of a membrane module and the inside surface of the tube;

the flow-blocking and flow-directing means being adapted to direct residue fluid into and out of the reheating zone; and (f) means for heating the outside surface of the tube.

The flow-blocking and flow-directing means is preferably an adapted end cap with a flow-directing channel and an outlet bore, as described above, or a flow-directing plate positioned between sequential membrane modules in the series.

The means for heating the outside surface of the tube is preferably a casing around the tube, through which a heating fluid can be passed.

The equipment may use multiple tubes, with a series of membrane modules within each tube. In this case, a single vessel is used to house the tubes, and the means of heating the outside surface of the tubes is preferably to circulate a heating fluid, such as steam, through the interior of the vessel outside the tubes.

If a multi-tube vessel is used, a representative and convenient number of tubes is seven tubes, and there are preferably at least three membrane modules in each tube.

It is to be understood that the above summary and the following detailed description are intended to explain and illustrate the invention without restricting its scope.

DETAILED DESCRIPTION OF THE INVENTION

All percentages herein are by weight unless otherwise stated.

The terms membrane module and membrane element are used interchangeably herein.

The terms tube, housing and vessel are used interchangeably as they relate to apparatus in which all of the membrane modules are contained in a single tube.

The terms assembly, housing and vessel are used interchangeably as they relate to apparatus in which all the membrane modules are contained in multiple tubes within a single housing.

The terms reheating space, reheating area and reheating zone have the same meaning and are used interchangeably herein.

The invention is a process for separating a component from a solution by pervaporation, and the equipment or apparatus to carry out such separation.

Any solution that may be treated by pervaporation may be treated by the process of the invention. Most commonly, the liquid to be treated will be a solution of one or more organic components in water, or of water in an organic solvent or solvent mixture, but solutions containing only organic or only inorganic components may also be treated. Separation of aromatics from paraffins in an oil refinery, removal of organic sulfur compounds from hydrocarbon mixtures, dehydration of bioethanol, recovery of ethanol from fermentation broth, and removal of volatile organic compounds (VOCs) from wastewater are typical representative examples of separations in which the process of the invention can be used to advantage.

The separation is carried out by running a feed stream of the liquid mixture across a separation membrane under pervaporation conditions. By pervaporation conditions, we mean that the vapor pressure of the component that it is desired to separate into the permeate stream is maintained at a lower level on the permeate side than on the feed side, and the pressure on the permeate side is such that the permeate is in the gas phase as it emerges from the membrane. The process results, therefore, in a permeate vapor stream enriched in the desired component or components and a residue liquid stream depleted in that component or components.

In a first aspect, the process is carried out using multiple membrane modules or elements arranged in series within a single tube.

A significant feature of the invention is that the feed solution need not be withdrawn from the tube for reheating. Instead, the feed solution is heated within the tube as it passes from module to module.

Figure 1:
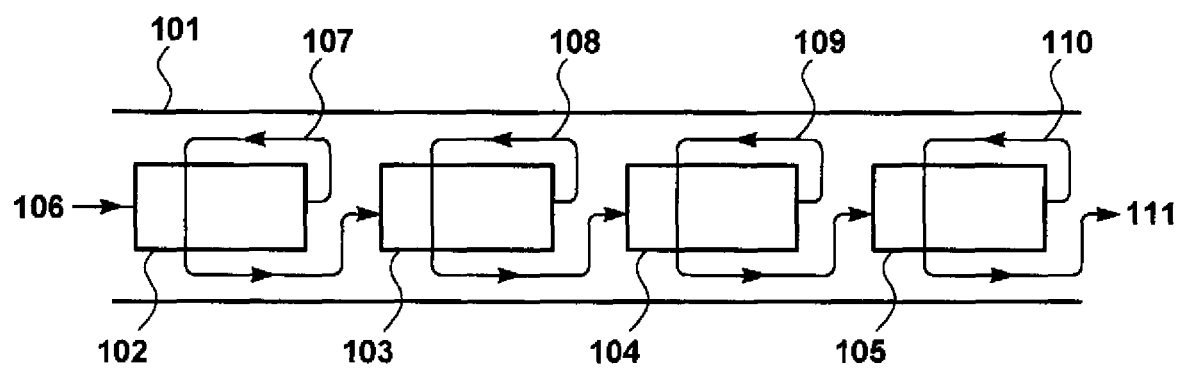
FIG. 1 is a schematic drawing showing the flow pattern in a pervaporation process of the invention.

FIG. 1 is a schematic drawing showing the general flow pattern in a representative pervaporation process according to this aspect. Referring to FIG. 1, the process is carried out in a tube or housing, 101, using a series of four membrane modules, 102, 103, 104 and 105.

The feed solution to be treated enters the process through line 106. Instead of passing directly from module 102 to module 103, the residue of the feed solution from module 102 flows in the reheating path indicated as 107, which takes it back along the outside of the module within the housing, and thence into the second module 103 in the series. In similar fashion, the residue from module 103 flows in reheating path, 108, from module 104 flows in reheating path, 109, and from module 105 flows in reheating path, 110. The treated solution leaves the housing and the process through line 111.

It will be apparent from FIG. 1 that an equivalent process could be carried out by reversing the direction of the flow pattern, so that the feed solution to be treated enters as stream 111, and the treated residue stream exits as stream 106.

FIG. 1 shows the residue from the last module in the series being reheated before leaving the process. This is often desirable, as well as being the simplest way to configure the process, in that the same types of fittings may be used for the last module in series as for the other modules. Optionally, however, the last residue stream can be withdrawn directly from the last module without directing it along a reheating path.

The invention is now described in greater details in its various aspects. In the following description, the inventors have not dwelt at length on the choice, manufacture and combination of conventional components of the equipment used to carry out their invention. The design and assembly of such is well known in the chemical engineering art, and is familiar to the engineer or readily available from standard industry literature.

It will be appreciated by those of skill in the art that the figures are very simple schematic diagrams, intended to make clear the key aspects of the equipment and processes of the invention, and that equipment may, and often will, include additional components of a standard type, such as seals, O-rings, connectors, pipes, feed end caps, flanges, bolts, and other fittings to join and seal components in fluid-tight manner as necessary.

Figure 2:
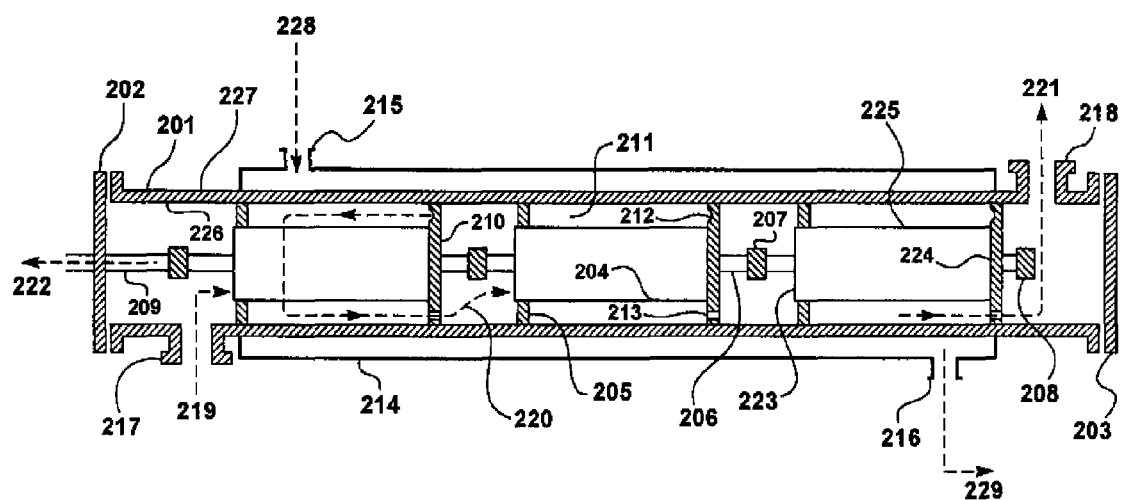
FIG. 2 is a schematic drawing showing, in longitudinal cross-section, the layout of modules and end caps in a pervaporation process of the invention in which the membrane modules are contained within a single tube.

FIG. 2 is a schematic drawing showing, in longitudinal cross-section, a representative, non-limiting layout of modules and end caps in a pervaporation process of the invention in which the membrane modules are contained within a single tube. Referring to this figure, a housing, pressure vessel or tube, 201, contains a series of membrane modules, in this case represented by three modules, 204, of which only one is labeled to avoid excessive numbers of lead lines over the drawing. Likewise, to assist clarity, other components or elements associated with each module, such as the residue end cap, seals and feed end, are identified only once in the drawing.

The housing takes the form of a cylindrical shell, having inside, 226, and outside, 227, surfaces and equipped with two removable heads, 202 and 203. In the drawing, the heads are shown as flanged, and assumed to be connected to the shell by bolts (not shown), although any convenient means to connect the heads to the shell is intended to be within the scope of this embodiment.

In the embodiment shown in FIG. 2, both heads are drawn as removable. This arrangement provides the greatest flexibility for assembly, maintenance and repair, because the membrane elements can be loaded or removed from either end.

Alternatively, the design can be simplified by permanently welding end 203 to the body of the vessel or manufacturing as a unitary part of the body of the vessel. The modules must then be loaded or unloaded from one end only, but the manufacturing cost of the vessel may be reduced.

The tube or housing may be made of any convenient material. Housings are usually made of metal, conforming to appropriate codes for the operating conditions to which they are to be exposed. Pervaporation processes are not usually operated at feed pressures substantially different from atmospheric, although they may be operated at high temperatures, above 100° C. In the case that the feed is introduced at ambient pressure, and 40° C., for example, a housing made from a plastic may suffice, so long as the material has adequate thermal conductivity. In the case that the feed is under high hydraulic pressure, or very hot, a stainless or carbon steel housing, for example, may be needed. In general, we prefer to use metal housings.

A feed port, 217, and a residue port, 218, are positioned near the ends of the housing. One or both of the end plates or heads is fitted with, or adapted to accept, permeate collection pipe, 209, through which treated permeate is removed from the processing train. Alternatively, a flanged permeate port to which the permeate pipes are connected could be provided.

The membrane modules or elements, 204, each having an outer longitudinal surface, 225, are arranged in line along the tube. To illustrate the arrangement, three modules in series are shown in FIG. 2. As a general guideline, we prefer to use at least two modules and no more than about six, although our processes may be carried out with any number of modules in the tube.

The modules may contain any type of membranes capable of separating the feed solution by pervaporation. They may be inorganic or polymeric, and may be packaged in any manner that enables them to fit in series within the housing. For example, inorganic membranes may be in tubular form, with the selective membrane on the inner or outer surface. This type of module is sometimes used when the separation membranes themselves are inorganic, or are supported on an inorganic support membrane, for example.

If the membranes are polymeric, they may be prepared as flat sheets and packaged as spiral-wound modules, or as hollow fibers and packaged as potted hollow-fiber modules, for example.

These forms are well known in the art and are described copiously in the literature. For simplicity, therefore, the details of module placement and connection, and fluid flow around and within the modules, are described below as they relate to polymeric membranes packaged as spiral-wound modules. Those of skill in the art will appreciate that similar arrangements can be used for other types of modules, subject only to minor, straightforward modifications as need be.

A spiral-wound module comprises one or more membrane envelopes of spacers and membrane wound around a perforated central permeate collection pipe, 206. Typically, the pipe protrudes from the module at both ends, as shown in the figure. The pipe may be made of any suitable material, such as plastic or metal.

When the module is in use for pervaporation, feed liquid enters at feed end, 223, and passes longitudinally down the module across the membrane envelope. A portion of the feed permeates as vapor into the membrane envelope, where it spirals towards the center, is drawn through the perforations into the permeate collection pipe and exits through the end of the pipe. The residue of the feed solution exits the module at the residue end, 224.

The modules are connected end-to-end, meaning that permeate gas leaving one module can flow into the permeate pipe of the next module. This can be achieved by having one long continuously formed pipe around which multiple membrane modules are wrapped. More preferably, however, the permeate pipes of the individual modules are separate pipes joined by gas-tight connectors or couplings, 207. If permeate is to be withdrawn from one end only, the line of pipes is sealed at the other end by end cap, 208.

The modules are sealed against the tube walls by annular seals, 205, to prevent feed solution bypassing the module, and to separate the residue solution that has exited a module from the feed solution entering that module.

Figure 3:
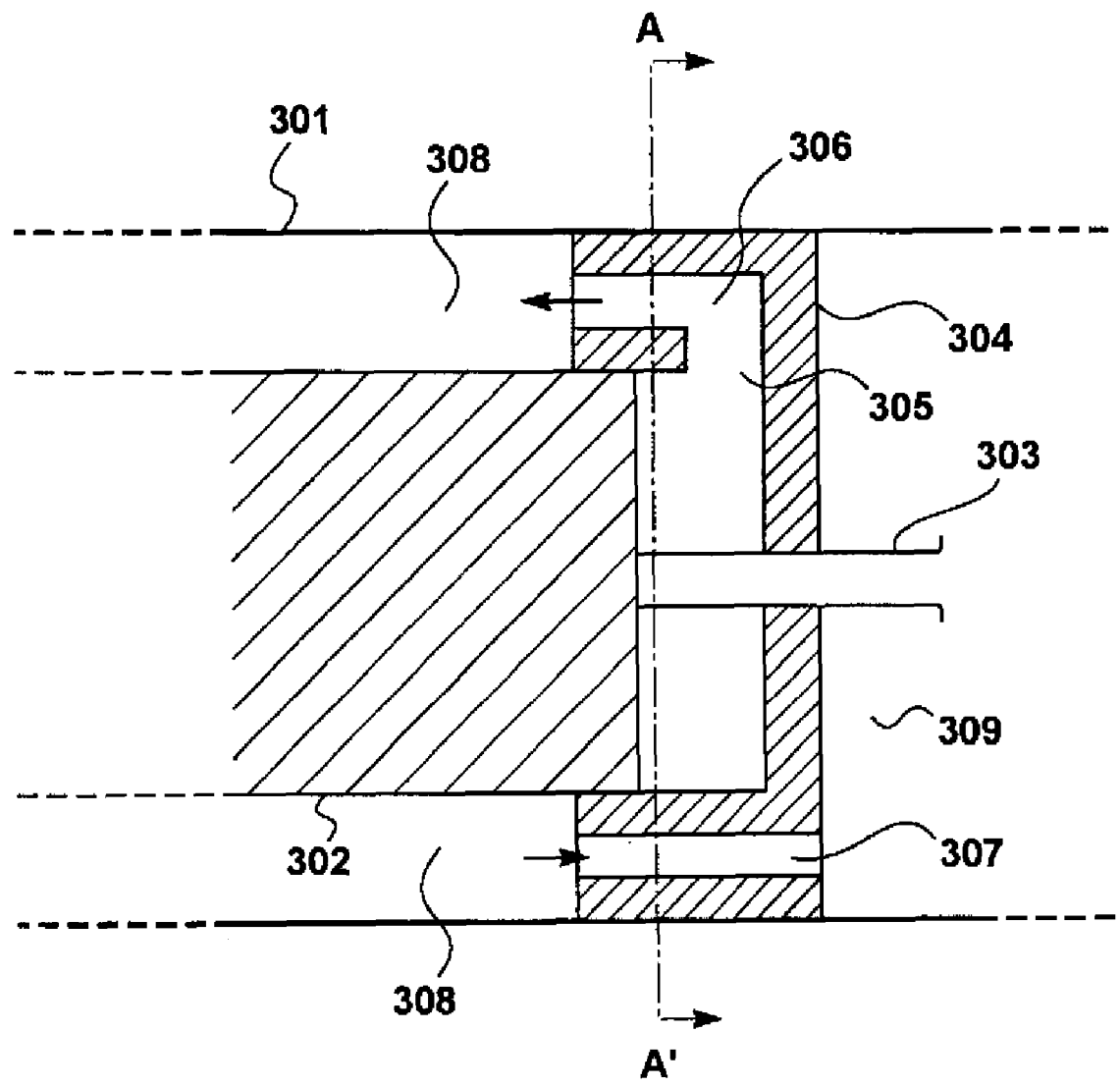
FIG. 3 is a schematic drawing showing a representative configuration of the end cap at the residue end of a module in longitudinal cross-section.

At the residue end of the modules are end caps, 210, typically made of steel or plastic. A larger view of a non-limiting, representative end cap configuration is shown in FIG. 3. Referring to this figure, tube, 301, contains a module, 302, seated in end cap, 304. The end cap is typically secured in fluid-tight connection against the tube by an O-ring or other seal, not shown. The end cap is adapted so that permeate collection pipe, 303, may fit through it. This may be accomplished in various ways, such as by forming the end cap as two semicircular pieces, as discussed more below, or by providing a suitably sized aperture in the end cap and using a fluid-tight seal to prevent residue solution leakage through the aperture.

The module is held securely in the end cap, typically by gluing, so that a small residue space, into which residue liquid leaving the membranes can pass, is provided. One or more fluid-directing channels, 306, are provided in the cap, so that residue solution exiting the module is directed as shown by the arrow into the annular reheating space, area or zone, 308.

An outlet bore or channel, 307, directs residue fluid as shown by the arrow from the reheating space to the feed space, 309, of the next module.

Figure 4:
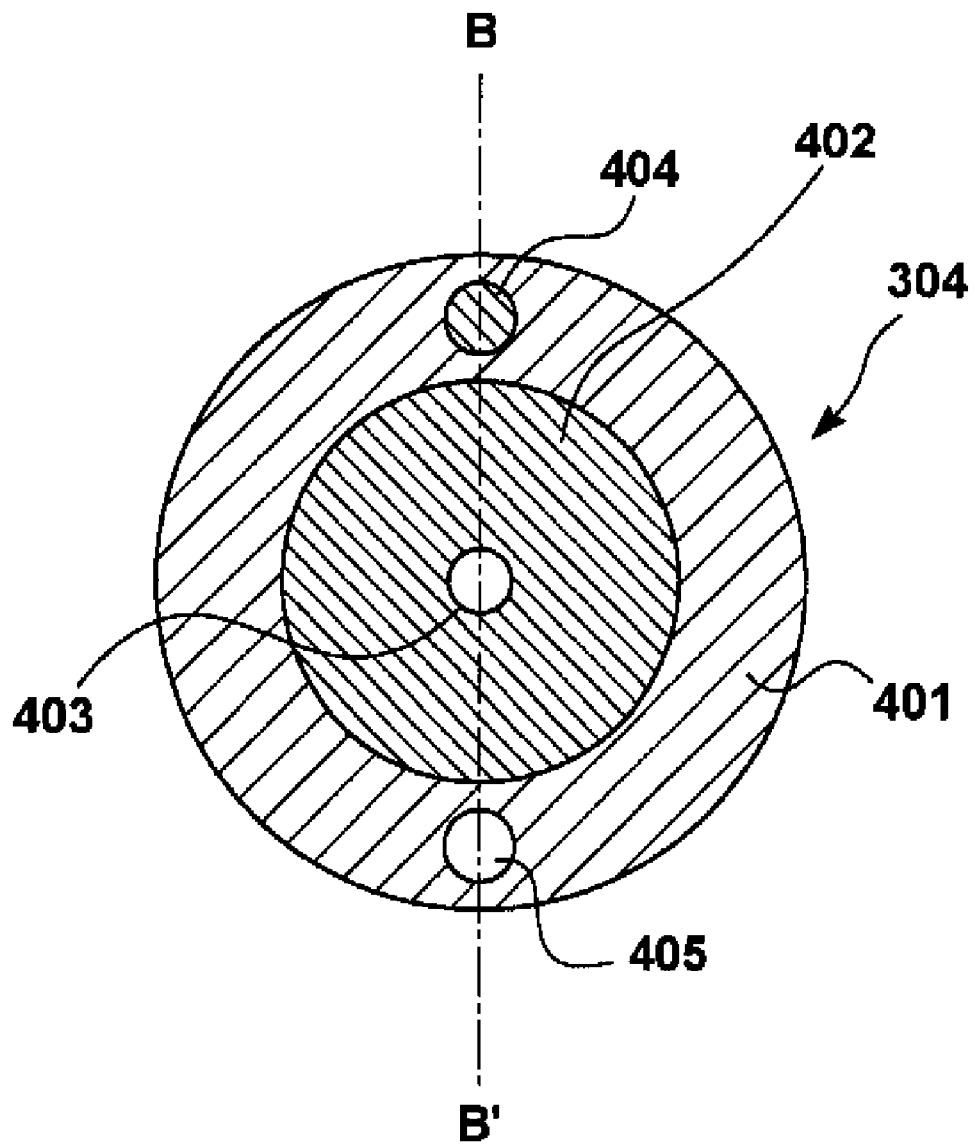
FIG. 4 is a schematic drawing showing a representative cross-section of an end cap such as that of FIG. 3 as it faces the residue end of a module.

A radial cross-section of end cap 304, taken along line A-A' looking in the direction of the arrows, is shown in FIG. 4. The end cap has a shallow cup shape, with a rim portion, 401, and a base portion, 402.

At the center of the base portion is a circular opening, 403, sized to accommodate the module permeate pipe. Channel, 405, is bored right through the thickness of the rim and base, and corresponds to outlet 307 in FIG. 3. The bore is shown as cylindrical, but could be any desired shape. The figure shows one bore; multiple bores could also be used.

Opening, 404, represents the open end of channel 306 in FIG. 3. This is also shown as cylindrical, but could be any other desired shape, such as a slit. Again, one or multiple channels may be used. To facilitate the machining of this channel, the cap is preferably manufactured in two halves and fixed together along line B-B'.

Figure 5:
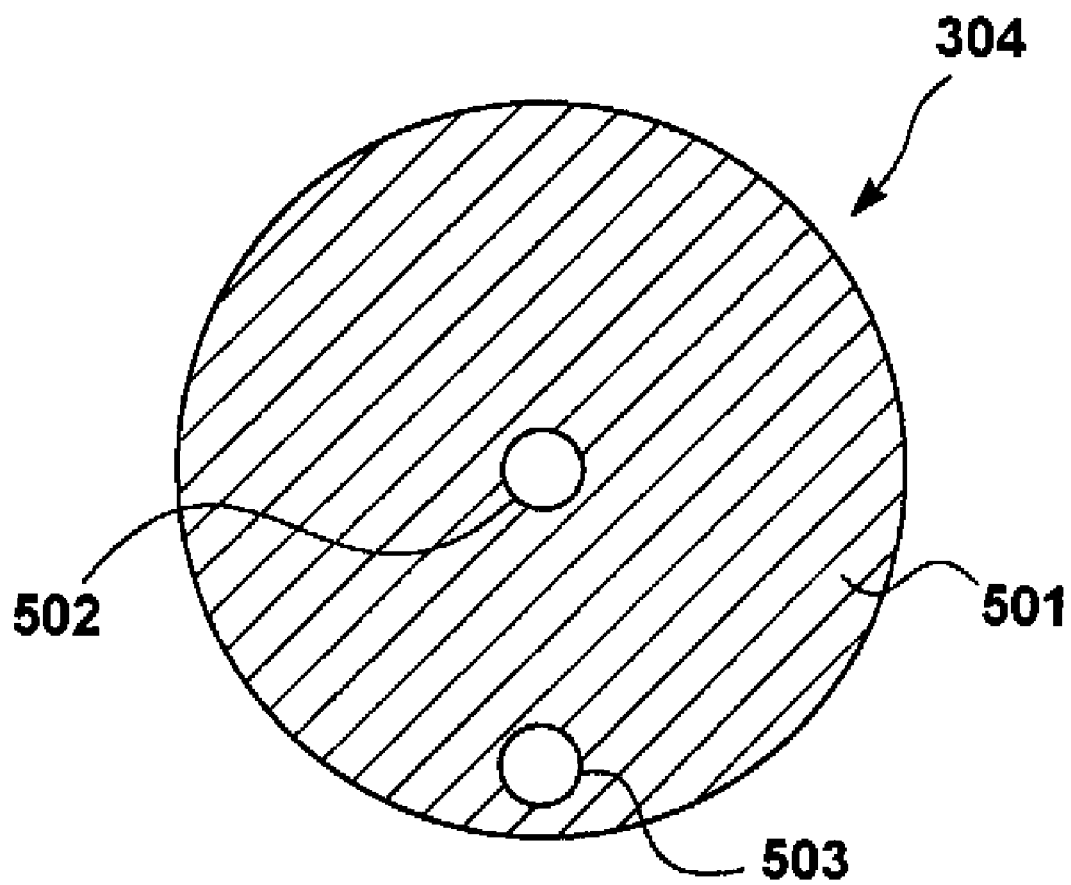
FIG. 5 is a schematic drawing showing a view of an end cap such as that of FIG. 3 as it faces the feed end of the next module in series.

A radial cross-section taken along line A-A' and viewed from the other side, as it would face the feed end of the next module when in place in the tube, is shown in FIG. 5. Base portion, 501, is perforated by permeate pipe opening, 502, and bore, 503, through which the residue emerges as feed for the next module.

Returning to FIG. 2, each module is surrounded by an annular reheating space, area or zone, 211, (corresponding to space 308 in FIG. 3), defined by the outer surface of the module, the inside surface of the tube, seal 205, and the residue end cap. Fluid to be reheated enters this zone through aperture, 212 (the outlet from channel 306 in FIG. 3), and leaves for the next module in series through bore, 213 (corresponding to element 307 in FIG. 3).

An outer casing, 214, is fitted to the outside of the tube, and equipped with ports, 215 and 216, through which a heating fluid, for example steam or hot oil, may be passed. In the alternative, any means of heating the outside of the tube may be substituted.

The pervaporation process of the invention is now described in a representative way as it is carried out using the system of FIG. 2.

The feed solution to be treated enters as shown by dashed arrow, 219, through the feed port. A driving force for transmembrane permeation is provided in the normal manner for pervaporation by maintaining the vapor pressure of the feed liquid higher than the vapor pressure on the permeate side.

Although any technique may be used to achieve this pressure difference, the commonest and simplest way is to heat the feed solution prior to introducing it into the equipment. The temperature to which the feed is heated may be chosen by the skilled artisan in consideration of the specific circumstances of the operation. For aqueous feed solutions, a temperature between about 30° C. and 100° C. is generally used. For solutions of higher boiling point, or that are held under elevated pressure, higher temperatures, such as 120° C. or more, are possible and may be preferred in some circumstances to increase flux.

In pervaporation, the permeate side of the membranes is held at pressure and temperature conditions that result in a vapor-phase permeate. The low pressure on the permeate side may be achieved in the normal manner, such as by simply cooling and condensing the permeate as it is withdrawn from the system or by using a vacuum pump to draw a partial vacuum.

The feed solution enters the first module, where it is separated according to pervaporation principles into a residue solution (that is, the residue of the feed solution that remains on the feed side of the membranes and that exits the residue end of the module), and a permeate vapor, each having a different composition from the feed solution. Representative examples include:

(a) a feed solution comprising about 10% ethanol in water, separated into a permeate vapor containing 40% ethanol and a residue solution containing 2 or 3% ethanol, using silicone rubber membranes in the modules;

(b) a feed solution of raw gasoline in a refinery comprising a total of 30% toluene, benzene and other aromatics, separated into a residue gasoline stream containing below 25% total aromatics and a permeate vapor containing 70% aromatics, using a fluorinated dioxole membrane;

(c) a feed solution of 5% water in acetic acid, dehydrated to a 0.5% water residue solution and a permeate vapor containing 60% water vapor, using a polyvinyl alcohol (PVA) membrane.

As the separation occurs, the latent heat required to evaporate the permeating components is supplied from the feed liquid, so the residue solution leaving the module is significantly cooler, such as 5° C., 10° C. or more cooler, depending on how much permeate vapor is produced.

The residue solution exits the module through aperture 212 and flows into and across the reheating space, as indicated generally by dashed arrow, 220, to become the feed solution for the next module.

A heating fluid is passed through the outer casing, as indicated by dashed arrows, 228 and 229, and flows in contact with the outside surface of the tube. The residue of the feed solution that is flowing in the reheating space is reheated by heat-exchange with the heating fluid across the tube wall.

The separation and subsequent reheating steps are repeated along the train of modules, and the final treated residue stream is withdrawn as indicated by dashed arrow 221.

The permeate vapor from each module is collected in the permeate pipes, 206 and withdrawn from the system as indicated by dashed arrow, 222.

Those of skill in the art will appreciate that the blocking of immediate flow of fluid from the residue end of one module to the feed end of the next module, and the directing of residue fluid into, across and out of the reheating space, could be achieved by any flow-blocking and flow-directing means suitably positioned within the tube between, or at the ends of, the modules, so long as that means is functionally equivalent to the apparatus elements shown in the figures so far.

Figure 6:
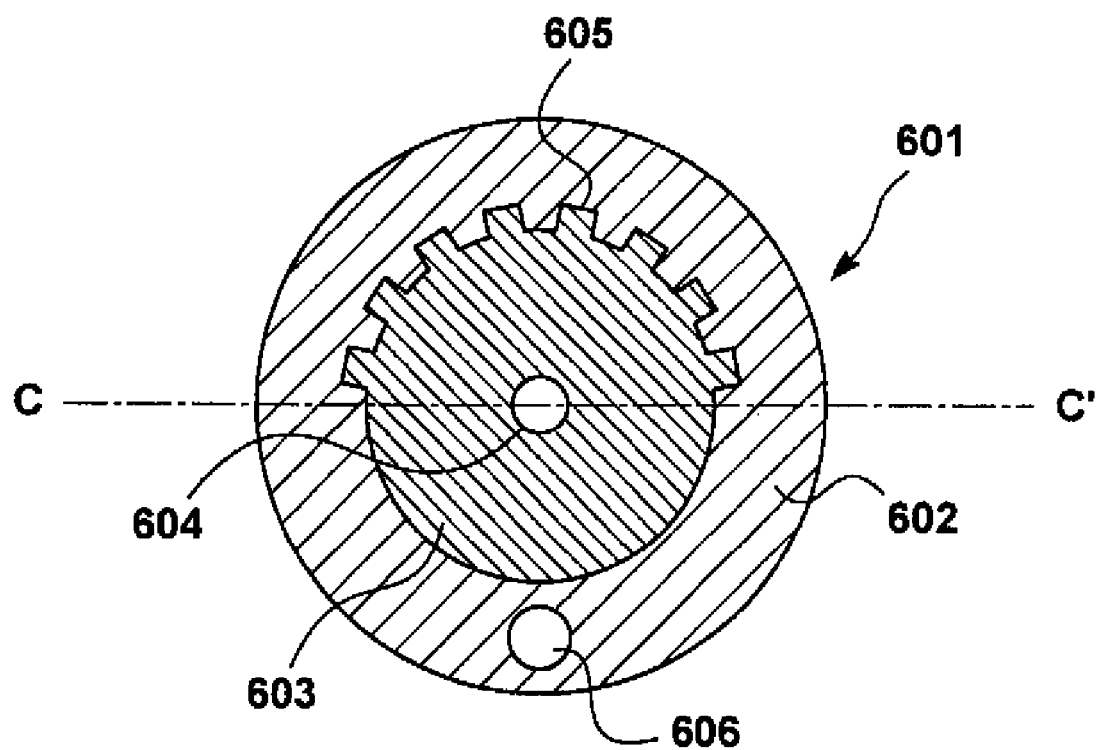
FIG. 6 is a schematic drawing showing an alternative arrangement of the flow channels in a residue end cap.

As an example, one simple equivalent is shown in FIG. 6, in which a residue end cap, 601, in shown in similar view to FIG. 4. As in FIG. 4, bore, 606, passes through the full thickness of rim, 602, and base, 603, to carry residue fluid from the reheating space of one module to the feed inlet of the next. Aperture, 604, is provided for the permeate pipe.

Instead of channel opening 404, the cap of FIG. 6 has a set of notches, 605, in one side of the rim, cut down as far as the base portion. When the module is inserted into its cap, the notches enable fluid to flow from the residue space to the reheating space. The cap may be made as two pieces, for example one half having the notches and the other the residue outlet bore, and assembled by joining the pieces along line C-C'.

Figure 9A:
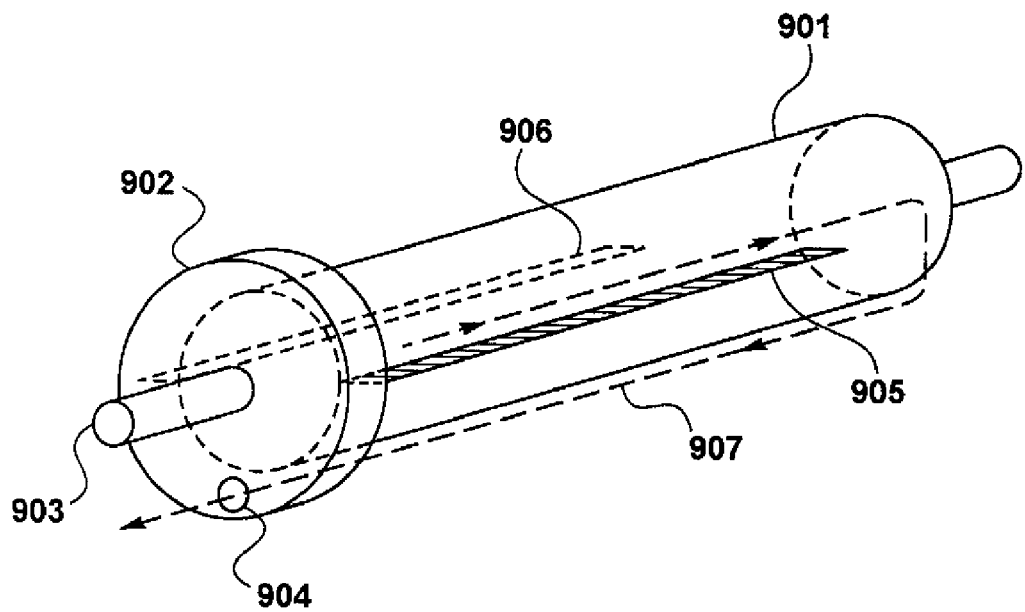
FIG. 9 is a schematic drawing showing the positioning of two ribs to divide the reheating space.
Figure 9B:
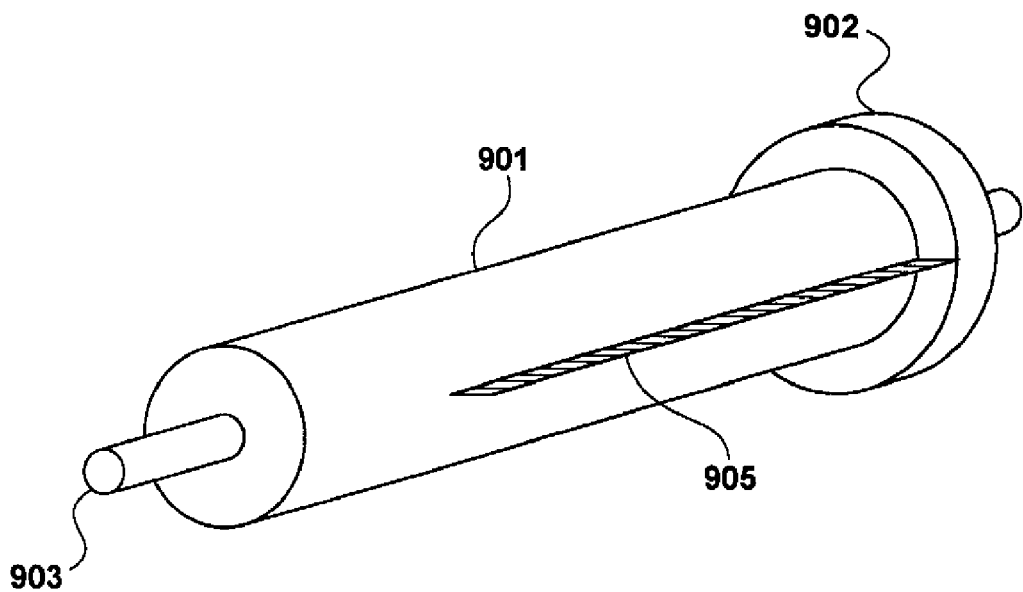

An optional enhancement that promotes circulation of the fluid to the end of the reheating space nearer to the feed end of the module is shown in FIG. 9. Referring to this figure, FIG. 9*a* shows a module and residue end cap as viewed with the end cap to the left of the figure; FIG. 9*b* shows the module as viewed with the residue end cap to the right. In both cases, the size of the cap is exaggerated for clarity.

Referring to FIG. 9*a*, module 901 is fitted with residue end cap, 902, through which protrudes permeate pipe, 903. Bore, 904, provides passage for the residue fluid out of the reheating space of one module to the feed space and feed end of the next. Two baffles or fins, 905 and 906, are positioned diametrically opposite to one another. The baffles are attached to the end cap, from which they extend within and partially along the reheating zone.

Each baffle has a width about the same as the radial thickness of the rim of the end cap. This may be seen more clearly in FIG. 9*b*, which simply shows, without any other details, the positioning of baffle 905 with respect to cap 902 and module 901. When the module with its end cap is inserted into the tube, not shown, the baffle will sit against the outer longitudinal wall of the module and the inside wall of the tube. This fit need not be fluid-tight, as the purpose of the baffle is simply to direct fluid flow to some extent.

When the module is in use in the process of the invention, residue fluid from the module will be constrained by the baffles to flow in a path as generally indicated by dashed line, 907 in FIG. 9*a*. That is, the residue fluid will exit the end cap into the reheating space, where it will be directed along the length of the module by the baffles until it can pass to the other side of the baffles and be drawn out through bore, 904.

The baffles are most conveniently attached to the end cap, although it will be apparent that they could be attached to the module or, less preferably, even to the inside of the tube.

FIG. 9 shows one pair of baffles or fins. More pairs, in conjunction with multiple fluid-directing channels in the end cap, could optionally be used to facilitate distribution of the residue solution in the reheating space.

FIG. 9 also shows the baffles as straight, although curved baffles could optionally be used to direct the residue fluid in a curved path, such as a helical path, instead.

Figure 10:
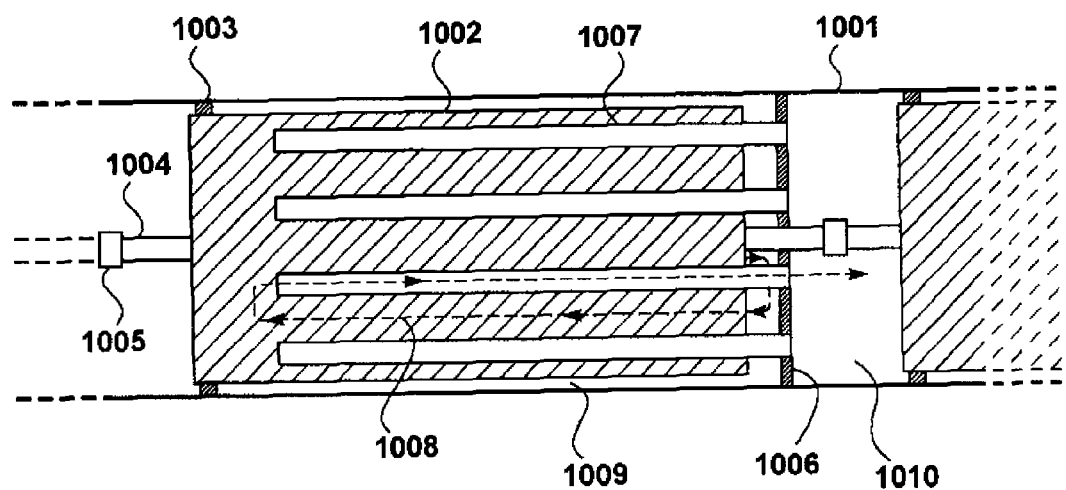
FIG. 10 is a schematic drawing showing, in longitudinal cross-section, an alternative arrangement for blocking and redirecting fluid flow at the residue end of a module.

An example of a different way to achieve blocking of straight-line flow of fluid from the residue end of one module to the feed end of the next is shown in FIG. 10. In this case, fluid exits the residue end of the module in conventional manner, but the flow-blocking and flow-directing means takes the form of an adapted flow-directing plate that is added between modules.

Referring to FIG. 10, tube, 1001, contains a series of modules, 1002, of which only one representative module is shown in full. The modules are sealed against the tube walls by annular seals, 1003, and are equipped with permeate pipes, 1004, which are connected together by couplings or connectors, 1005.

Instead of the adapted, flow-directing end caps shown in FIGS. 2-6, the apparatus is provided with flow-directing plates, 1006, through which the permeate pipes can pass as shown. In some regards, these plates resemble tube sheets, in that they can hold the permeate pipes in place.

More importantly, however, the plates block the straight-line flow of fluid from the residue end of one module to the feed end of the next. The plates are perforated by hollow tubes or ducts, 1007, that extend from the plate, so that they lie along the reheating space, 1009, over a portion of the length of the module.

Figure 11:
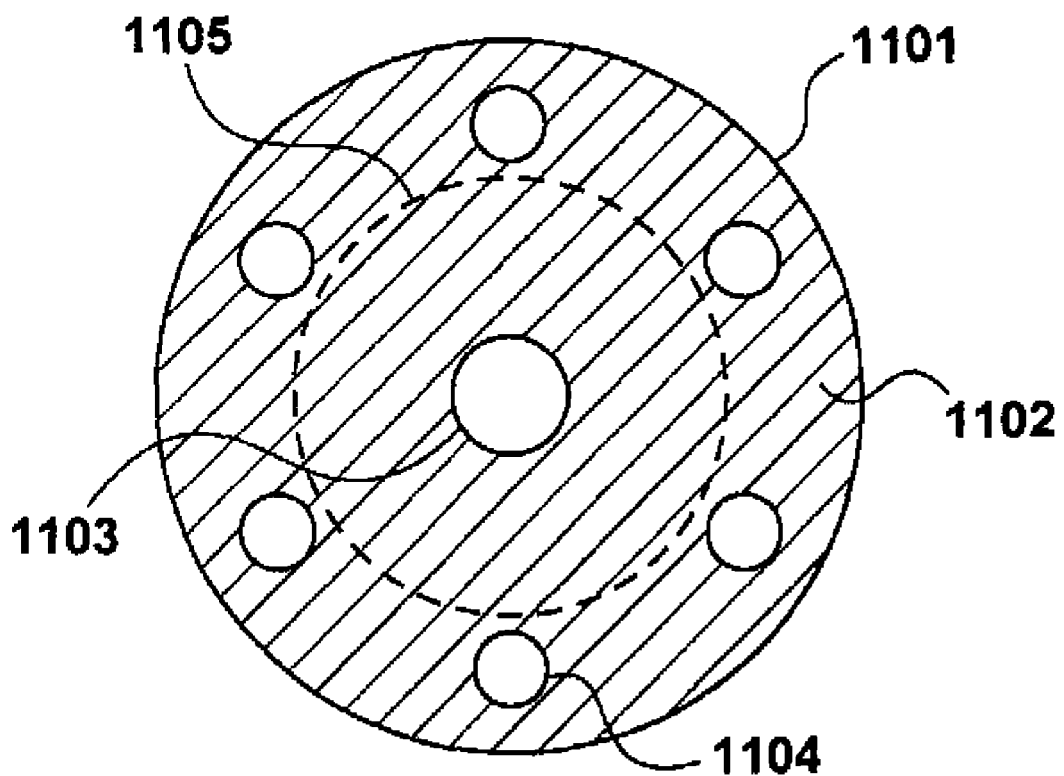
FIG. 11 shows the blocking arrangement of FIG. 10 in radial cross-section.

The positioning of the hollow ducts is more easily seen in radial cross-section, as in FIG. 11. In this view, flow-directing plate, 1101, has a solid face, 1102, an aperture, 1103, through which a permeate pipe can pass, and a set of hollow ducts or tubes, 1104, positioned around the periphery of face 1102 outside the perimeter, 1105, of the module.

As with the baffles of FIG. 9, the ducts are shown as straight tubes, but could be curved.

To carry out the process of the invention, a feed liquid for separation is passed through the train of modules, generally as described above with respect to FIG. 2. In this case, liquid exiting the residue end of the module is constrained by the flow-directing plate to flow into the reheating space 1009 according to the flow path indicated generally by dashed line, 1008. After it has passed across the reheating space, liquid enters the hollow tubes, and flows through them to exit into the feed space, 1010, of the next module.

In a second aspect, the invention uses multiple series of modules, mounted in multiple tubes, the tubes being mounted in a single assembly, vessel or housing. The invention in this aspect has certain features in common with co-owned U.S. Pat. Nos. 7,404,843 and 7,510,594, and co-owned, co-pending U.S. patent application Ser. No. 11/484,547, which describe the uses and advantages of multi-tube housings for gas separation. Additional information regarding disposition of corresponding elements of the apparatus, operation, benefits, and so on may be found in these patent applications.

Figure 7:
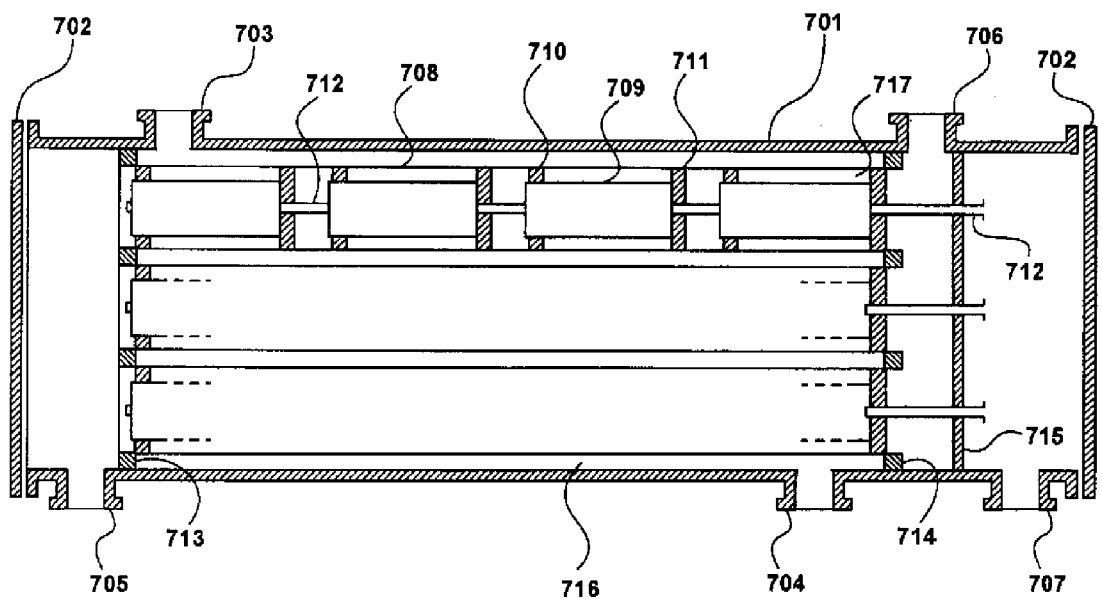
FIG. 7 is a schematic drawing showing, in longitudinal cross-section, the layout of modules and end caps in a pervaporation process of the invention in which the membrane modules are contained within multiple tubes in a single housing.

FIG. 7 is a schematic drawing showing, in longitudinal cross-section, a representative, non-limiting layout of modules and end caps to carry out a preferred pervaporation process of the invention using such a configuration. The details of the arrangement of modules, permeate pipes and end caps within a tube that were described with respect to FIG. 2 are applicable within the tubes to this embodiment also.

Referring to FIG. 7, the assembly includes a vessel, 701, containing a plurality of tubes, 708. Three tubes, of which only the top one is labeled to avoid long lead lines over other parts of the drawing, are visible in the longitudinal sectional view. The figure represents an assembly with 7 tubes in total, shown in radial view in FIG. 8, discussed below. The ends of the tubes are open to allow fluid flow into and out of the tubes.

The housing has feed and permeate ends, 702. In the drawing, the feed and permeate ends are shown as removable flanged heads, connected to the body of the shell by bolts (not shown). However, any convenient means of connection of the ends is intended to be within the scope of this embodiment, and in some variants, discussed below, only one end need be removable.

The housing has five ports for admitting or removing fluids. A feed port, 705, is positioned near the feed end, and residue port, 706, and permeate port, 707, are positioned near the permeate end. Ports, 703 and 704, give access to the interior, 716, of the housing outside the tubes. A heating fluid, such as steam or hot oil, can be circulated through the housing by passing the hot fluid in at port 703 and withdrawing from port 704 (or vice versa).

Each tube, 708, contains membrane elements or modules, 709. For clarity, the membrane module(s) are drawn in full in the top tube, and indicated only at the ends and by the dashed portions in the other tubes. Four membrane elements are shown, although any convenient number could be used.

Permeate pipe, 712, represents the total length of permeate pipes and connectors, and is usually configured with a separate permeate pipe for each membrane element, as shown in FIG. 2, for example. The modules are sealed against the tube walls by annular seals, 710, at the feed end. At the residue end, each module has a residue end cap, 711. The end caps may be configured in any manner, such as those discussed already and shown in FIGS. 3, 4, 5 and 6, that enables feed solution under treatment to exit as a residue stream into the reheating spaces, 717, and to pass thence to the feed end of the next module, in similar manner to that shown in FIG. 2.

Alternatively, any other method of blocking and directing fluid flow from one module to the next, such as by using the flow-directing plates shown in FIGS. 10 and 11, may be used.

A feed-end tube sheet, 713, is welded or otherwise mounted in the housing towards the feed end. This tube sheet supports the tubes in spaced-apart relationship with each other.

At the other end of the housing, two tube sheets are provided. Tube sheet, 714, supports the modules and directs residue fluid from the individual tubes to the residue port, 706. Tube sheet, 715, allows passage of the permeate pipes and directs the combined permeate streams from the individual permeate pipes to the permeate port, 707.

In the embodiment shown in FIG. 7, both tube sheets 713 and 714 have openings that correspond in width to the tube diameter, and both heads are drawn as removable. This arrangement provides the greatest flexibility for assembly or maintenance.

If tube sheet 715 is welded or otherwise permanently fixed in the housing, as will generally be the case, then it must also have apertures large enough to pass the modules through, if the ability to load or unload the modules from the permeate end is needed. This may be accomplished by providing large apertures, but sealing the annular space around the permeate pipe with an end-plate, as shown in FIG. 2 of Ser. No. 11/050,995.

If the modules cannot be passed through tube sheet 715, then the permeate end of the housing may be permanently welded or formed as a unitary part with the shell of the housing.

Figure 8:
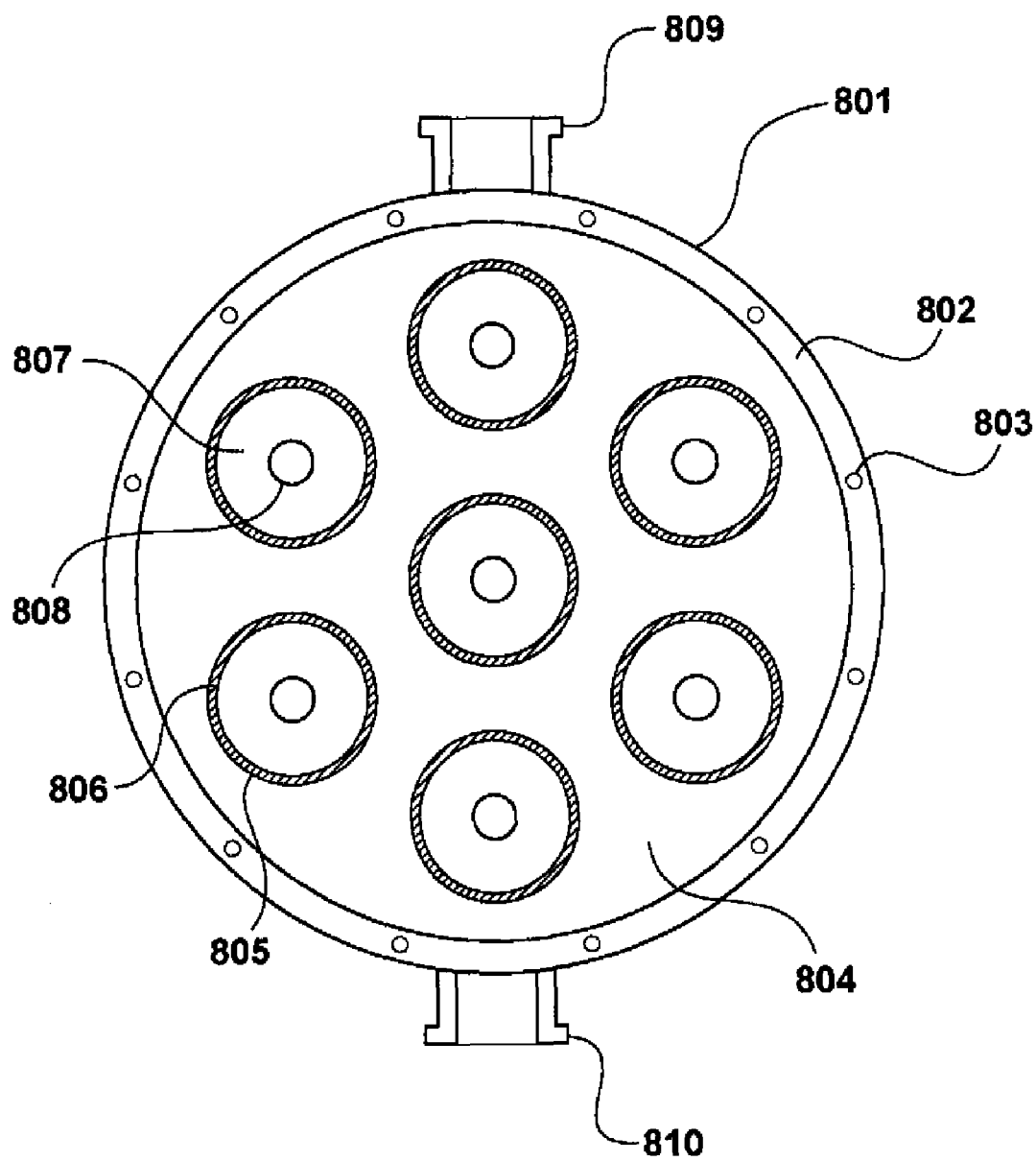
FIG. 8 is a schematic cross-sectional drawing showing placement of 7 tubes in an assembly such as that of FIG. 7.

FIG. 8 shows a radial cross-sectional layout diagram of a preferred assembly, such as that of FIG. 7, containing seven tubes. The cross-section shows the placement of the tubes within the housing or assembly, as viewed looking in at the feed end of the housing.

Referring to FIG. 8, housing or assembly, 801, is equipped with flange, 802, having bolt holes, 803, for attaching the feed end or head. The feed-end tube sheet, 804, has openings, 805, for supporting the tubes. From the feed end of module, 807, protrudes permeate pipe, 808.

Seals, 806, correspond to annular seals, 710, in FIG. 7, and hold the modules in fluid-tight relationship against the tube walls. Feed port, 810, and steam or other heating fluid port, 809, are visible.

Within the limits of engineering practicability, the housing may contain any number of tubes. For example, another ring of tubes could be added outside the ring of six in FIG. 8, for a total of 19 tubes.

To carry out the process of the invention using a multi-tube housing of the type shown in FIG. 7, steam or other heating fluid is circulated in the housing outside the tubes. The feed solution to be treated is introduced through port 705, enters the individual tubes and is treated in the manner described above with reference to FIG. 2.

Heat exchange takes place across the tube walls between the heating fluid flowing in interior space 716 and the residue fluid flowing in the reheating spaces, 717. The treated residue-stream exits each tube and flows out of the assembly through port 706. The permeate vapor flows along tubes 712 and out of the assembly through port 707.

In a third aspect, the invention is the pervaporation equipment, system or apparatus used to carry out the pervaporation separation processes described above. In the case that only one tube of modules is used, the apparatus is as described and shown by FIG. 2 and equivalents. In the case that multiple tubes in a single assembly are used, the equipment is as described and shown by FIG. 7 and equivalents.

The invention is now illustrated in further detail by specific examples. These examples are intended to further clarify the invention, and are not intended to limit the scope in any way.

EXAMPLES

Example 1

A bench-scale version of the apparatus of FIG. 2 was built. The tube contained two 4-inch diameter modules, containing ethanol-selective membranes. The housing was fitted with thermocouples so that the temperature of the feed solution could be measured as it flowed through the apparatus. In this way, the actual feed solution temperature drop during a pervaporation experiment could be compared to the theoretical temperature drop that would have occurred in the absence of reheating.

A series of pervaporation tests using a feed solution containing about 10 wt % ethanol in water was performed. In each test, 25 gallons of ethanol/water feed solution were loaded into a feed tank and circulated through the system. The permeate pressure was maintained at about 50 torr. Hot oil was circulated as heating fluid. At steady-state, temperature readings were obtained from the thermocouples at various locations along the module tube.

Measurements of the quantity and composition of the permeate were used to calculate the permeance and selectivity of the membrane at various conditions.

Figure 12:
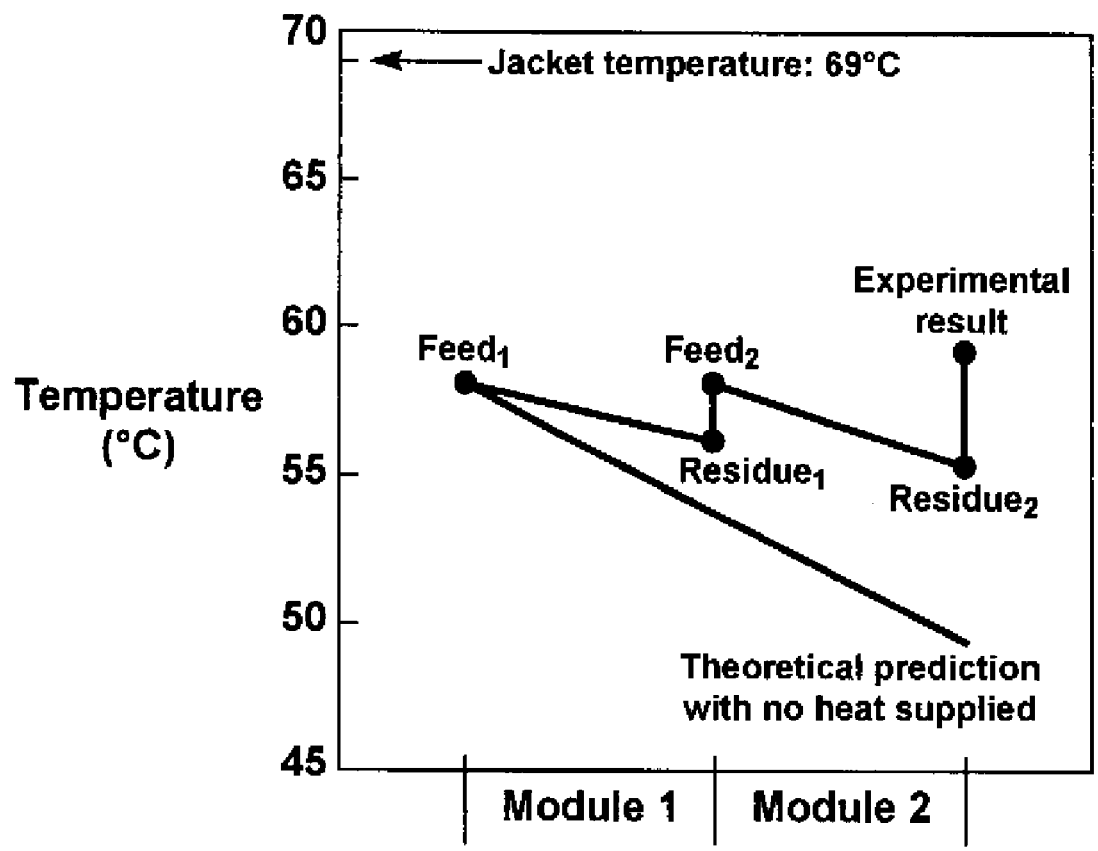
FIG. 12 is a plot showing temperature profiles along two membrane modules in a one-tube assembly similar to that of FIG. 2.

The permeance calculations were used to predict the theoretical heat loss that would have occurred if there were no reheating. The results for a set of experiments in which the feed solution was initially at 58° C., the oil temperature was 69° C., the feed flow rate was 1 gpm, and about 0.8 wt % of the feed solution passed through the membranes in each module are shown in FIG. 12.

If the separation had been conducted under conditions in which no external heating was supplied, the temperature of the final residue solution would have dropped to about 49° C., that is, about 9° C. lower than the feed solution temperature, as shown by the straight line in the figure.

Since transmembrane flux depends on the vapor pressure of the permeating components, and vapor pressure depends on temperature, a temperature drop of 9° C. corresponds to a significant drop in transmembrane flux (up to about 35% loss of flux) for this separation.

Using the apparatus and process in accordance with the invention, the original feed temperature was restored by reheating the residue of the feed solution from the first module before the solution entered the second module. In this experiment, a difference of 11° C. between the heating fluid and initial feed fluid temperatures was sufficient to reheat the residue solution to the desired operating temperature (and hence to maintain transmembrane flux), as shown by the jagged line.

The experiments showed that the invention provides an effective pervaporation process, without needing to reheat the feed solution outside the tube.

Example 2

Another set of experiments was carried out following the same procedure as described for Example 1, except that the heating fluid was at 90° C. instead of 69° C., and the initial feed solution temperature was 72° C., not 58° C.

Figure 13:
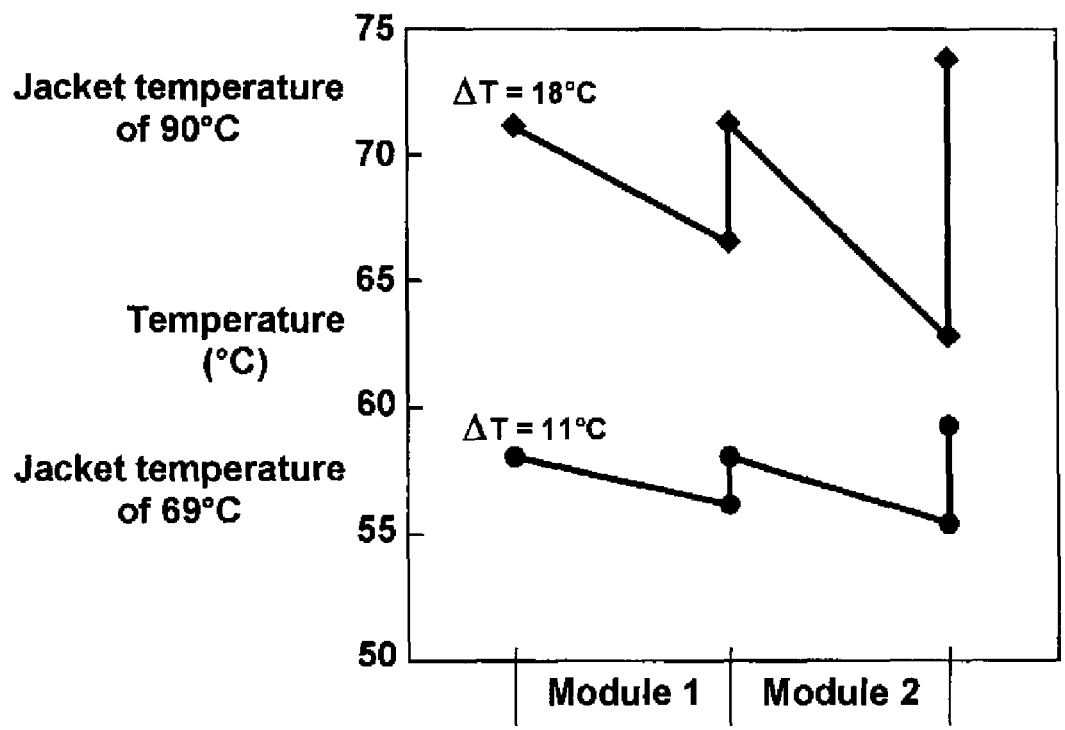
FIG. 13 is a plot comparing temperature profiles along two membrane modules in a one-tube assembly similar to that of FIG. 2 at different temperature differentials between the heating fluid and the feed solution.

The results of this set of experiments are compared with those of Example 1 in FIG. 13.

As can be seen, at a feed temperature of 58° C., the temperature drop along a single module was only about 3-4° C., whereas at a feed temperature of 72° C., the temperature drop was about doubled, at 8-10° C. per module. At higher feed temperature, the transmembrane flux is higher, so the amount of permeate to be evaporated is greater, and the heat extracted from the feed solution to do this is greater, resulting in a greater temperature drop.

The greater temperature drop means that to maintain the entering feed temperature for each module at 72° C., a temperature difference of 18° C. between the feed solution and the heating fluid was required. In contrast, at a feed temperature of 58° C., with lower flux and lower temperature drop, a temperature difference of only 11° C. was required.

We claim:

1. A pervaporation assembly, comprising:
   (a) a series of multiple membrane modules, each membrane module having an outer longitudinal surface, a feed end and a residue end, and including a permeate pipe protruding from the membrane module, the membrane modules having their permeate pipes connected in an end-to-end manner;
   (b) a tube containing the membrane modules, the tube comprising at least one removable head and a shell having an inside surface and an outside surface, the tube being provided with a feed inlet port and a residue outlet port and adapted so that a permeate stream flowing through the permeate pipes may be withdrawn from the tube;
   (c) an annular seal for each membrane module, positioned so as to provide a fluid-tight seal between the outer longitudinal surface of the module and the inside surface of the tube;
   (d) flow-blocking and flow-directing means positioned in the tube so as to block immediate flow of a fluid from the residue end of a membrane module to the feed end of the next membrane module in the series;
   (e) an annular reheating zone between the outer longitudinal surface of a membrane module and the inside surface of the tube;
   the flow-blocking and flow-directing means being adapted to direct residue fluid into and out of the reheating zone; and
   (f) means for heating the outside surface of the tube.

2. The pervaporation assembly of claim 1, wherein the flow-blocking and flow-directing means comprises an end cap mounted on the residue end, the end cap including a flow-directing channel to provide fluid communication from the residue end to the reheating zone and an outlet bore to provide fluid communication from the reheating zone to the feed end of the next membrane module in the series.

3. The pervaporation assembly of claim 2, further comprising multiple baffles extending from the end cap into and partially along the reheating zone.

4. The pervaporation assembly of claim 1, wherein the flow-blocking and flow-directing means comprises a flow-directing plate positioned between sequential membrane modules in the series.

5. The pervaporation assembly of claim 1, wherein the means for heating the outside surface comprises a casing fitted to the outside of the tube, and equipped with ports through which a heating fluid may be passed.

6. The pervaporation assembly of claim 1, comprising multiple series of membrane modules, contained in multiple tubes, and further comprising a vessel in which the tubes are mounted, the vessel having an interior and being equipped with ports through which a heating fluid may be circulated in the interior outside the tubes, this heating fluid being the means for heating the outside surface of the tubes.

7. The pervaporation assembly of claim 6, wherein the vessel contains seven tubes.

8. The pervaporation assembly of claim 6, wherein the series comprise at least three membrane modules.

* * * * *